(12) United States Patent
Bird (10) Patent No.: US 11,746,556 B2
(45) Date of Patent: Sep. 5, 2023

(54) FOLDABLE GROUND BLIND

(71) Applicant: Jason Bird, Kingsley, IA (US)

(72) Inventor: Jason Bird, Kingsley, IA (US)

(*) Notice: Subject to any disclaimer, the term of this patent is extended or adjusted under 35 U.S.C. 154(b) by 0 days.

(21) Appl. No.: 17/861,596

(22) Filed: Jul. 11, 2022

(65) Prior Publication Data

US 2022/0341209 A1 Oct. 27, 2022

Related U.S. Application Data

(63) Continuation of application No. 16/986,842, filed on Aug. 6, 2020, now Pat. No. 11,421,440, which is a continuation of application No. 16/567,202, filed on Sep. 11, 2019, now Pat. No. 10,767,387.

(60) Provisional application No. 62/730,354, filed on Sep. 12, 2018.

(51) Int. Cl.
*E04H 15/00* (2006.01)
*E04H 15/46* (2006.01)
*A01M 31/02* (2006.01)

(52) U.S. Cl.
CPC ............ *E04H 15/46* (2013.01); *A01M 31/025* (2013.01); *E04H 15/001* (2013.01)

(58) Field of Classification Search
CPC ...... E04H 15/001; E04H 15/46; A01M 31/025
See application file for complete search history.

(56) References Cited

U.S. PATENT DOCUMENTS

| | | | |
|---|---|---|---|
| 2,783,766 A | 3/1957 | Kohlbeck | |
| 3,052,249 A | 9/1962 | Seaman et al. | |
| 3,190,300 A | 6/1965 | Wear | |
| 4,086,931 A | 5/1978 | Hall | |
| 4,554,937 A | 11/1985 | Irwin | |
| 4,632,138 A | 12/1986 | Irwin | |
| 4,723,371 A | 2/1988 | Williams | |
| 5,214,872 A | 6/1993 | Buyalos | |
| 6,138,700 A | 10/2000 | Stoddart | |
| 7,565,909 B2 | 7/2009 | Reis et al. | |
| 7,828,003 B2 | 11/2010 | Montecucco | |
| 7,918,236 B2 * | 4/2011 | Elder | E04H 15/003 135/33.7 |
| 7,958,904 B2 | 6/2011 | Lau | |
| 8,104,494 B2 | 1/2012 | Elder | |
| 8,869,783 B2 | 10/2014 | Faherty | |
| 9,066,512 B2 | 6/2015 | Nolz et al. | |
| 9,238,924 B2 | 1/2016 | Wyant | |
| 9,512,632 B2 | 12/2016 | Cook | |
| 9,556,638 B2 | 1/2017 | Clendaniel et al. | |
| 2008/0083443 A1 | 4/2008 | Eastman | |
| 2009/0301531 A1 | 12/2009 | Elder | |
| 2015/0250161 A1 | 9/2015 | Wyant | |

(Continued)

FOREIGN PATENT DOCUMENTS

GB 2297099 A 7/1996
WO WO2014128382 A1 8/2014

*Primary Examiner* — Noah Chandler Hawk (74) *Attorney, Agent, or Firm* — Kinney & Lange, P.A.

(57) ABSTRACT

A foldable hunting blind uses a hub assembly to easily expand into its final configuration with side supports used to stabilize the blind. Further, the foldable hunting blind includes apertures in each wall configured to hold and direct firearm muzzles away from hunters within the blind and a door through the front wall allowing a dog to easily enter and exit the blind.

15 Claims, 7 Drawing Sheets

(56) References Cited

U.S. PATENT DOCUMENTS

2015/0250162 A1\* 9/2015 Wyant .................... E04H 15/48
                                                                   135/147
2018/0066446 A1   3/2018 Nolz
2018/0334829 A1  11/2018 Thayer \* cited by examiner

FOLDABLE GROUND BLIND

CROSS-REFERENCE TO RELATED APPLICATION(S)

This application is a continuation of U.S. patent application Ser. No. 16/986,842 filed Aug. 6, 2020 for "FOLDABLE GROUND BLIND" by Jason Bird which is a continuation of U.S. patent application Ser. No. 16/567,202 filed Sep. 11, 2019 for "FOLDABLE GROUND BLIND" by Jason Bird which claims the benefit of U.S. Provisional Application No. 62/730,354 filed Sep. 12, 2018 for "FOLDABLE GROUND BLIND" by Jason Bird, the disclosures of which are incorporated by reference in its entirety.

This application is related to U.S. Pat. No. 10,563,423, filed on Sep. 11, 2019, entitled "FOLDABLE GROUND BLIND," the disclosure of which is incorporated by reference in its entirety.

BACKGROUND

The present disclosure relates to a ground blind, and more particularly, to a foldable ground blind configured for hunting birds.

Ground blinds are commonly used by hunters or other outdoorsman to conceal themselves and their movements from the observation of wild animals. Specifically, ground blinds are used by hunters and other outdoorsman to avoid scaring away wild animals. Typically, a hunter or other outdoorsman sits within or behind a ground blind that is camouflaged on its outer surface to blend in with the surrounding environment. Ground blinds can be used for a variety of purposes, such as hunting wild animals, viewing wild animals, and photography of wildlife. No matter the use, it is desirable that the ground blind be lightweight, portable, and easy to assemble/disassemble.

There are many different styles of ground blinds that have been made that are lightweight, portable, and easy to assemble/dissemble. One such ground blind is a hub style ground blind, which typically consists of a canvas cover and a hub assembly making up each wall of the ground blind. Each hub assembly includes flexible rods extending from a center hub to the corners of the canvas cover. When the ground blind is in an open position the hub assembly is inverted into a concave orientation, creating tension in the canvas cover and holding each wall in place. Hub style ground blinds are typically made from 2 or more hub assemblies attached to one another, with each hub assembly constituting a single wall of the ground blind.

Typical hub style ground blinds are not configured to allow a hunter to effectively and safely hunt birds. Therefore, there is a need for improvement in the art of ground blinds such that the ground blind is configured to be suitable for safely and effectively hunting birds.

SUMMARY

According to one aspect of the disclosure, a foldable blind includes a front wall, a first side wall having a triangular shape coupled to the front wall, a second side wall having a triangular shape coupled to the front wall, and a single hub assembly. The first side wall includes a first side support and the second side wall includes a second side support. The hub assembly includes a hub attached to an inner surface of the front wall and a plurality of rods extending from the hub to each corner of the front wall.

According to another aspect of the disclosure, a method of assembling a foldable blind includes standing the foldable blind on a plurality of corners of a front wall; applying pressure to an inner surface of a single hub assembly to invert the hub assembly into a tensioned concave position from an inside of the front wall, wherein the hub assembly includes a hub attached to an inner surface of the front wall and a plurality of rods extending from the hub to each corner of the front wall; rotating a triangular first side wall and a triangular second side wall away from the inner surface of the front wall, wherein the first side wall includes an aperture and a first side support, and the second side wall includes an aperture and a second side support; standing the foldable blind on a bottom edge of the front wall, the first side wall, and the second side wall; loosening a first clamp positioned on the first side support and a second clamp positioned on the second side support; extending the first side support and the second side support from a shortened position to an extended position; and tightening the first clamp positioned on the first side support and the second clamp positioned on the second side support.

DETAILED DESCRIPTION

Figure 1A:
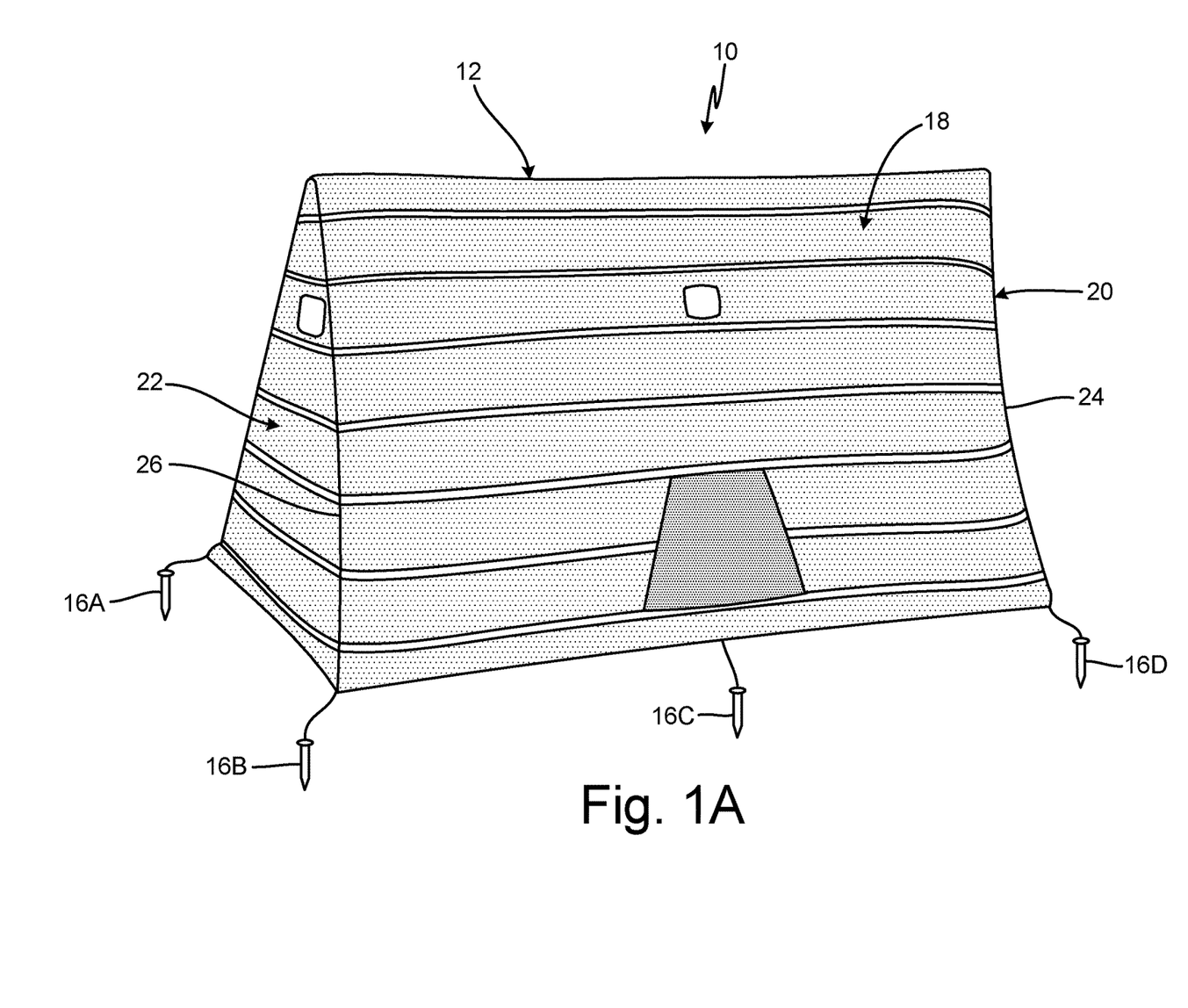
FIG. 1A is a perspective front view of a foldable blind in a setup configuration.
Figure 1B:
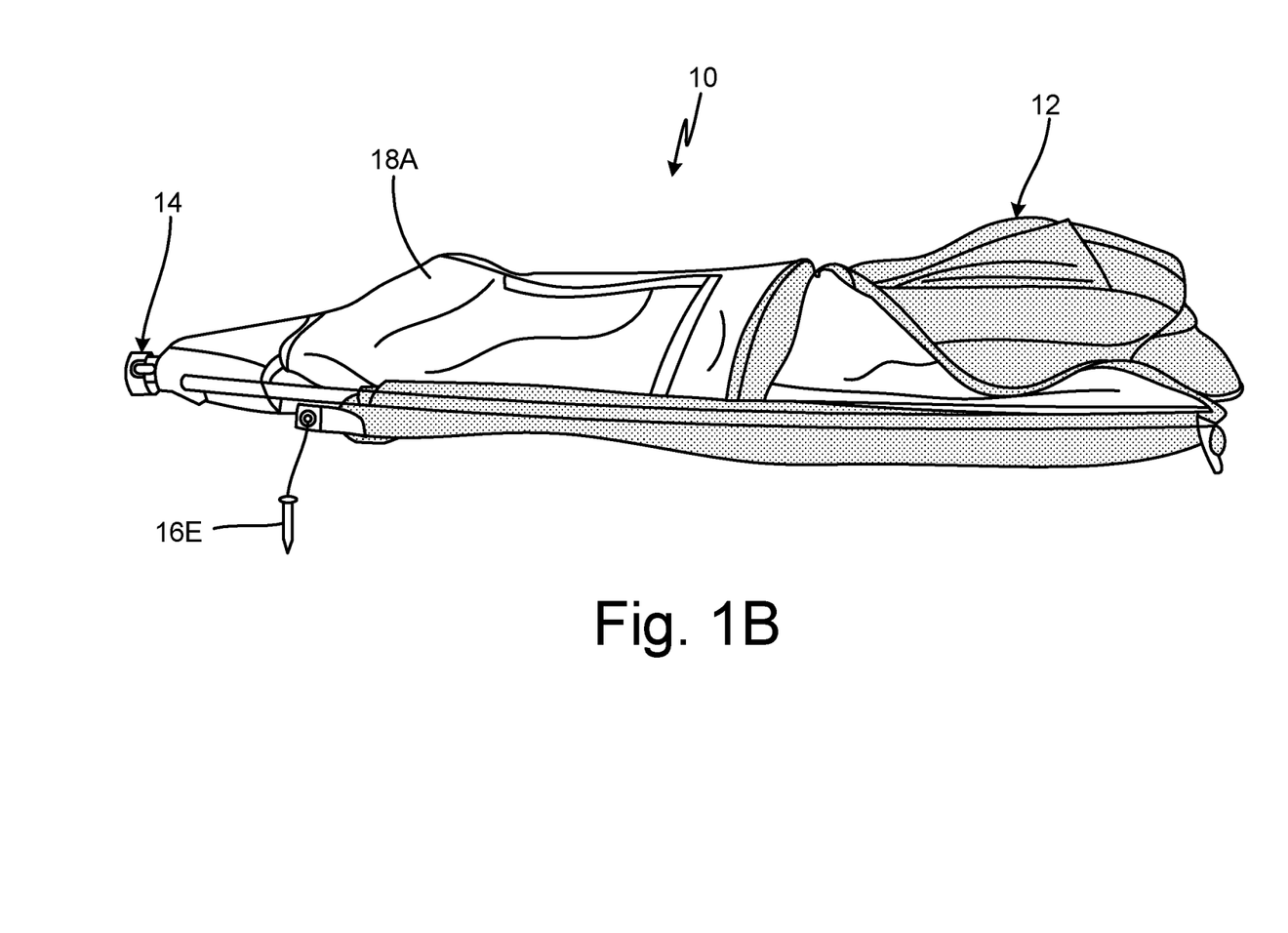
FIG. 1B is a perspective view of the foldable blind of FIG. 1 in a collapsed configuration.

FIG. 1A is a perspective front view of foldable blind 10 in a setup configuration. FIG. 1B is a perspective view of foldable blind 10 in a collapsed configuration. FIGS. 1A-1B will be discussed together. Foldable blind 10 includes fabric body 12, hub assembly 14, and anchors 16A-16E. Fabric body 12 includes front wall 18, first side wall 20, and second side wall 22. Front wall 18 is connected to first side wall 20 at first edge 24, located at the intersection of the two walls. Front wall 18 is also connected to second side wall 22 at second edge 26, located at the intersection of the two walls and opposite first edge 24. As shown in FIG. 1B, hub assembly 14 is coupled to front wall 18. Anchors 16A-16E are attached to the bottom corners of front wall 18, first side wall 20, and second side wall 22, and also at a bottom center location of front wall 18.

Foldable blind 10 is a hunting blind that is configured to fold into a collapsed configuration, allowing the user to easily transport foldable blind 10 to a desired location with minimal difficulty. As shown in FIG. 2B, when foldable blind 10 is in the collapsed configuration fabric body 12 and hub assembly 14 are parallel to each other. Foldable blind 10 utilizes hub assembly 14 to quickly and easily expand fabric body 12 into its setup configuration. Fabric body 12 provides resistance to hub assembly 14, allowing expanded hub assembly 14 to remain in tension and keeping foldable blind 10 stable in the setup configuration. Fabric body 12 is a fabric material that is pliable, water resistant, and capable of withstanding harsh weather conditions. Anchors 16A-16E are used to secure foldable blind 10 to the ground to prevent foldable blind 10 from blowing away in the wind. Anchors 16A-16E are typical anchors used for tents or hunting blinds and will not be discussed in detail.

Figure 2A:
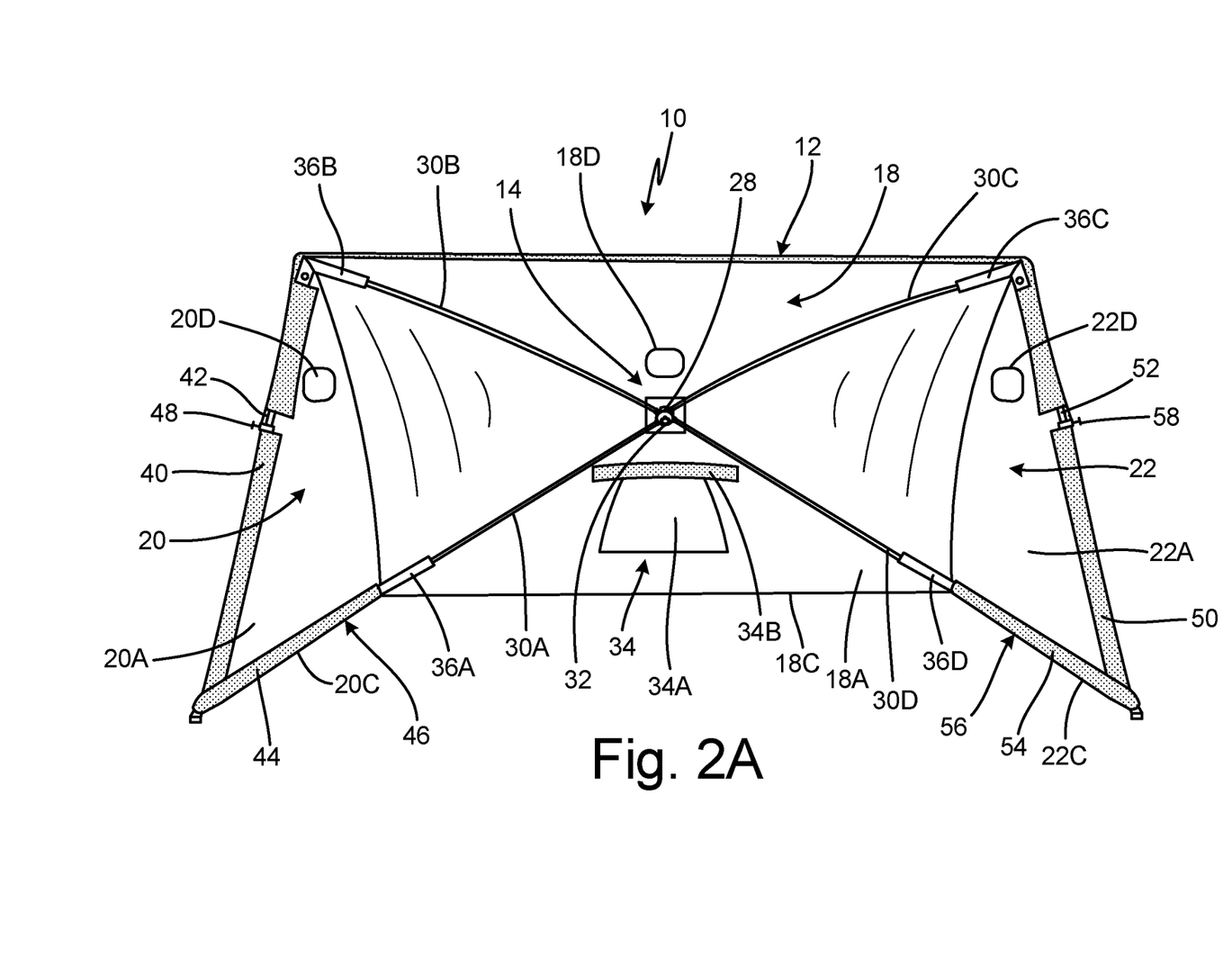
FIG. 2A is a rear view of the foldable blind of FIG. 1 in a setup configuration.
Figure 2B:
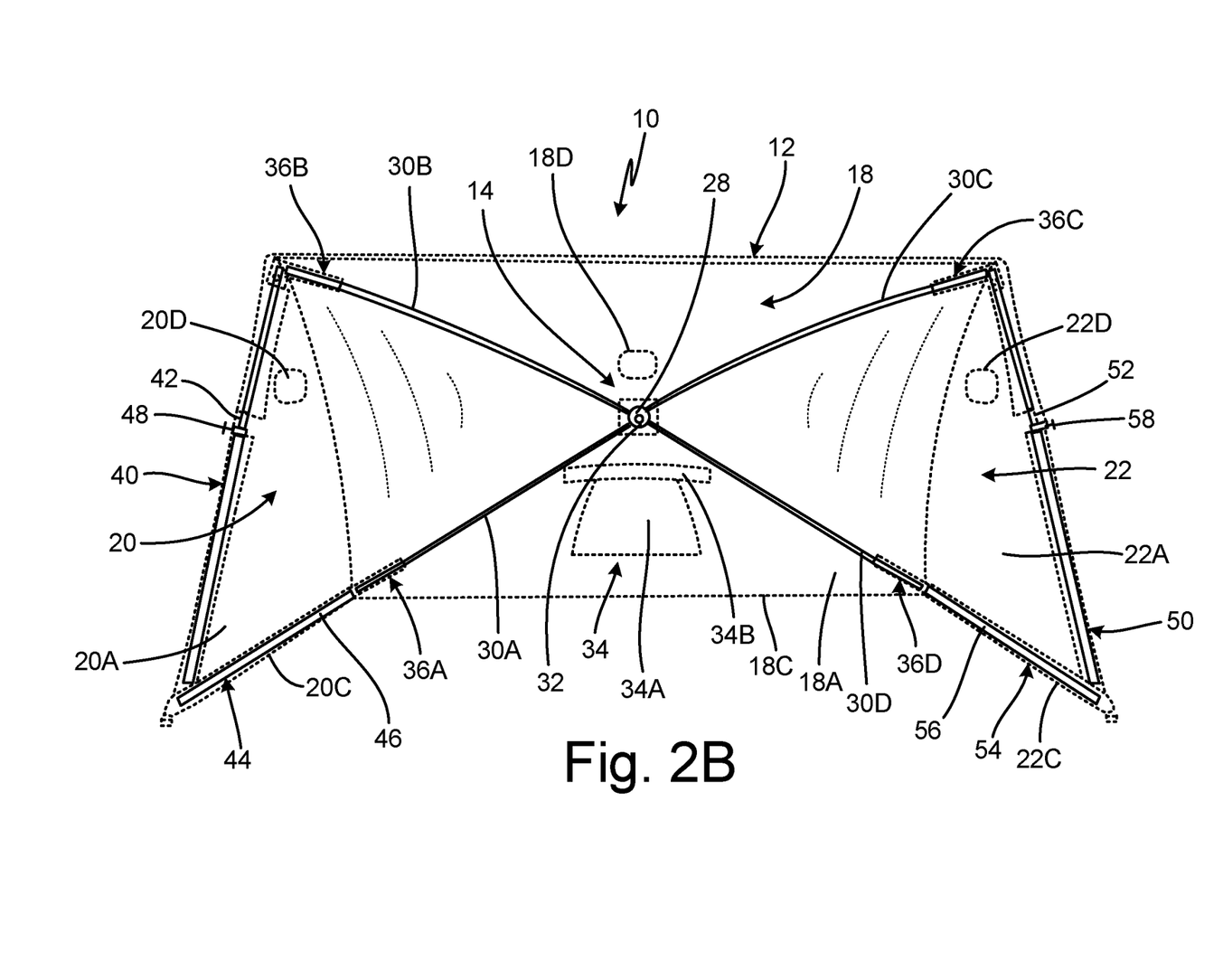
FIG. 2B is a rear view of the foldable blind of FIG. 2A emphasizing the rods of the assembly.
Figure 2C:
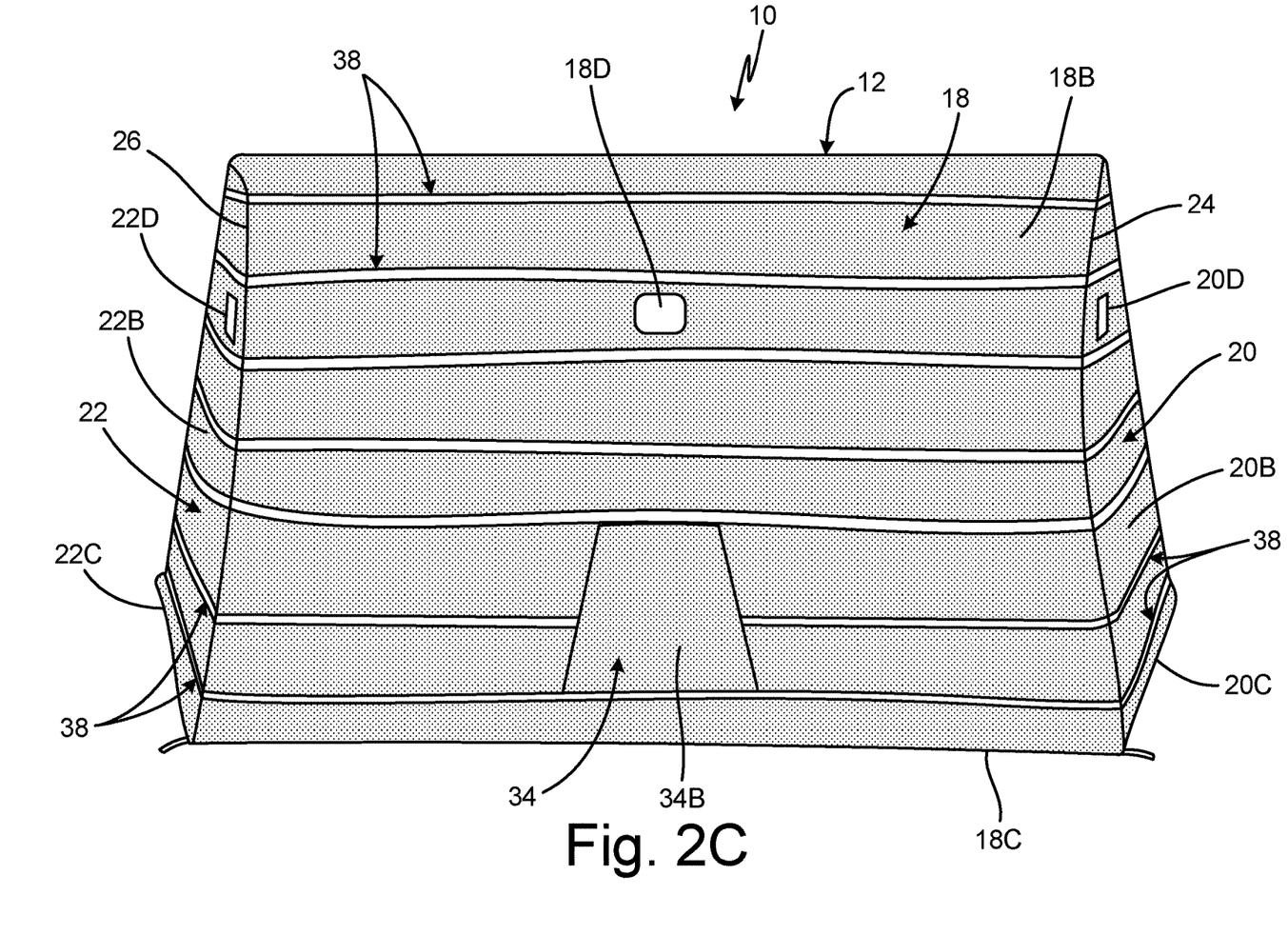
FIG. 2C is a front view of the foldable blind of FIG. 1 in a setup configuration.
Figure 2D:
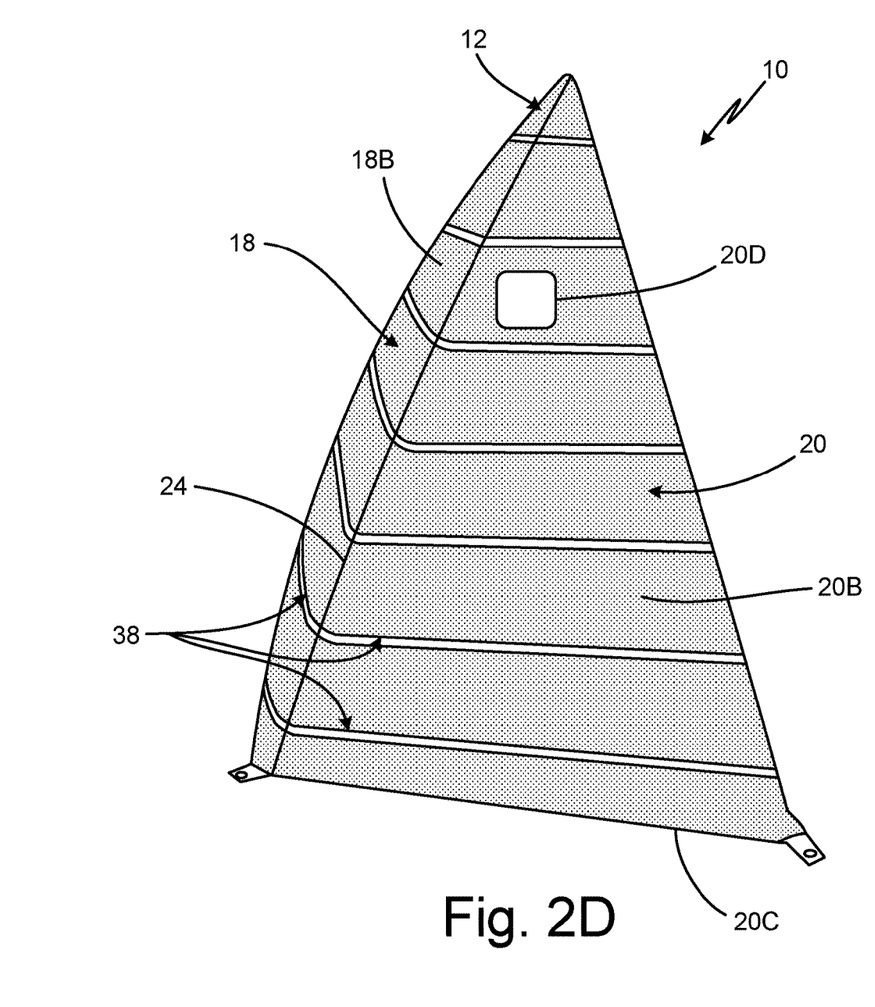
FIG. 2D is a side view of the foldable blind of FIG. 1 in a setup configuration.

FIG. 2A is a rear view of foldable blind 10 in a setup configuration. FIG. 2B is a rear view of foldable blind 10 in a setup configuration, emphasizing the rods of foldable blind 10. FIG. 2C is a front view of foldable blind 10 in a setup configuration. FIG. 2D is a side view of foldable blind 10 in a setup configuration. FIGS. 2A-2D will be discussed together. Foldable blind 10 includes fabric body 12, hub assembly 14, and anchors 16A-16E (not shown). Hub assembly 14 includes hub 28, rods 30A-30D, and loop 32. Fabric body 12 includes front wall 18, first side wall 20, and second side wall 22. Front wall 18 includes inner surface 18A, outer surface 18B, bottom edge 18C, aperture 18D, door 34, rod pockets 36A-36D, and stubble straps 38. First side wall 20 includes inner surface 20A, outer surface 20B, bottom edge 20C, aperture 20D, first side sleeve 40, first side support 42, first base sleeve 44, first base support 46, first clamp 48, and stubble straps 38. Second side wall 22 includes inner surface 22A, outer surface 22B, bottom edge 22C, aperture 22D, second side sleeve 50, second side support 52, second base sleeve 54, second base support 56, second clamp 58, and stubble straps 38.

As shown in FIGS. 2A-2C, front wall 18 includes inner surface 18A, outer surface 18B, bottom edge 18C, aperture 18D, door 34, rod pockets 36A-36D, and stubble straps 38. Inner surface 18A is the inside surface of front wall 18 based on the location of the user during use of foldable blind 10. Outer surface 18B is the outer surface of front wall 18 based on the location of the user during use of foldable blind 10. Bottom edge 18C is the bottom most edge of front wall 18, and bottom edge 18C extends across the entire width of front wall 18. Aperture 18D extends through front wall 18, is positioned above hub 28 of hub assembly 14, and approximately in the center of front wall 18 widthwise. In the embodiment shown, aperture 18D is described in a specific location, but in other embodiments aperture 18D can be positioned anywhere on front wall 18.

Door 34, which includes door opening 34A and door cover 34B, is positioned below hub 28 of hub assembly 14 and near bottom edge 18C of front wall 18. Door 34 is also positioned in the center of front wall 18 widthwise and door opening 34A extends through front wall 18. In the embodiment shown, door cover 34B can be rolled up in an open position or door cover 34B can be unrolled in a closed position. In another embodiment, door 34 can use any suitable means to hold door 34 in the open and closed positions. Door 34 is configured to be a dog door, in which a dog can enter and exit foldable blind 10 by passing through door 34. Door 34 allows a dog to quickly and easily enter or exit foldable blind 10 when retrieving birds. Further, door 34 allows foldable blind 10 to be placed close to or within natural vegetation, in which entering or exiting foldable blind 10 from the open side is difficult, to better conceal the user while still allowing a dog to easily enter and exit foldable blind 10. Rod pockets 36A-36D are attached to inner surface 18A of front wall 18 and adjacent to each corner of front wall 18. Each rod pocket 36A-36D is configured to encompass an end of one of the rods 30A-30D, securely holding each rod 30A-30D when in both the setup and collapsed configurations of foldable blind 10. In the embodiment shown, there are four rod pockets 36A-36D but in other embodiments there can be as many rod pockets as there are corners to front wall 18. Shown in FIG. 2C, stubble straps 38 are attached to outer surface 18B of front wall 18. Stubble straps 38 are discussed further below.

Shown in FIGS. 2A-2D, first side wall 20 is a triangular shaped wall extending from first edge 24 of front wall 18. First side wall 20 includes inner surface 20A, outer surface 20B, bottom edge 20C, aperture 20D, first side sleeve 40, first side support 42, first base sleeve 44, first base support 46, first clamp 48, and stubble straps 38. Inner surface 20A is the inside surface of first side wall 20 based on the location of the user during use of foldable blind 10. Outer surface 20B is the outer surface of first side wall 20 based on the location of the user during use of foldable blind 10. Bottom edge 20C is the bottom most edge of first side wall 20 and bottom edge 20C extends the entire length of first side wall 20. When foldable blind 10 is in the setup configuration, bottom edge 20C is adjacent to the ground surface. Aperture 20D extends through first side wall 20 and is positioned near the top corner of first side wall 20. In the embodiment shown, aperture 20D is described in a specific location, but in other embodiments aperture 20D can be positioned anywhere on first side wall 20. Shown in FIGS. 2C-2D, stubble straps 38 are attached to outer surface 20B of first side wall 20.

First side sleeve 40 is positioned along and extends the entire length of the outside edge of first side wall 20. First side support 42 is a telescoping rod that is positioned within and fixedly attached to first side sleeve 40 at one end of the rod and securely held in place by first side sleeve 40 at the other end of the rod. In the embodiment shown, first side support 42 is fixedly attached to first side sleeve 40 using a screw or bolt. In another embodiment, first side support 42 can be fixedly attached to first side sleeve 40 using any other suitable means, such as (but not limited to) a clamp, a clip, or a strap. First side support 42 is configured to telescope between a shortened position and an extended position. With first side support 42 in the shortened position first side wall 20 is able to fold in against inner surface 18A of front wall 18, between rods 30A and 30B. This allows foldable blind 10 to fold into the collapsed configuration in which rods 30A-30D and first side support 42 are parallel to each other. When first side support 42 is in the extended position, foldable blind 10 can stand in its upright setup configuration. First side support 42 provides stability and support to foldable blind 10.

In the embodiment shown, first side support 42 is fixedly attached to first side sleeve 40 of first side wall 20 and configured to telescope between a shortened position and an extended position. In another embodiment, first side support 42 can be an extendable or fixed-length rod that is removable from first side sleeve 40 of first side wall 20. Removing the rod allows first side wall 20 to fold in against inner surface 18A of front wall 18 and also allows foldable blind 10 to fold into its collapsed configuration. When first side support 42 is fixedly attached to first side wall 20, first side support 42 must be an extendable/retractable rod to allow foldable blind 10 to collapse into the configuration in which all rods and poles are parallel to each other. When first side support 42 is removable from first side wall 20, first side support 42 can be extendable or fixed-length. With the extendable or fixed-length rod removed, foldable blind 10 is able to fold into the collapsed configuration in which all rods and poles are parallel to each other. A fully collapsed foldable blind 10 is essential for easy and efficient transport of foldable blind 10.

First base sleeve 44 is positioned along and extends the entire length of bottom edge 20C of first side wall 20. First base support 46 is a fixed-length rod positioned within and fixedly attached to first base sleeve 44 at one end of the rod and securely held in place by first base sleeve 44 at the other end of the rod. In the embodiment shown, first base support 46 is fixedly attached to first base sleeve 44 using a screw or bolt. In another embodiment, first base support 46 can be fixedly attached to first base sleeve 44 using any other suitable means, such as (but not limited to) a clamp, a clip, or a strap. First base support 46 provides extra support and stability to foldable blind 10 when in the setup configuration. In the embodiment shown, first base support 46 is included in foldable blind 10. In another embodiment, first base support 46 does not need to be included in foldable blind 10.

First clamp 48 is positioned within a notch in first side sleeve 40 and located on first side support 42. First clamp 48 securely holds first side support 42 in both the shortened position and the extended position. In the embodiment shown, first clamp 48 is a thumb screw that is turned by hand to tighten or loosen first clamp 48. In another embodiment, first clamp 48 could be a set screw, a collet, or other locking or clamping device that could secure first side support 42 in both the shortened position and the extended position.

Shown in FIGS. 2A-2D, second side wall 22 is a triangular shaped wall extending from second edge 26 of front wall 18. Second side wall 22 includes inner surface 22A, outer surface 22B, bottom edge 22C, aperture 22D, second side sleeve 50, second side support 52, second base sleeve 54, second base support 56, second clamp 58, and stubble straps 38. Inner surface 22A is the inside surface of second side wall 22 based on the location of the user during use of foldable blind 10. Outer surface 22B is the outer surface of second side wall 22 based on the location of the user during use of foldable blind 10. Bottom edge 22C is the bottom most edge of second side wall 22 and bottom edge 22C extends the entire length of second side wall 22. When foldable blind 10 is in the setup configuration, bottom edge 22C is adjacent to the ground surface. Aperture 22D extends through second side wall 22 and is positioned near the top corner of second side wall 22. In the embodiment shown, aperture 22D is described in a specific location, but in other embodiments aperture 22D can be positioned anywhere on second side wall 22. Shown in FIG. 2C, stubble straps 38 are attached to outer surface 22B of second side wall 22.

Second side sleeve 50 is positioned along and extends the entire length of the outside edge of second side wall 22. Second side support 52 is a telescoping rod that is positioned within and fixedly attached to second side sleeve 50 at one end of the rod and securely held in place by second side sleeve 50 at the other end of the rod. In the embodiment shown, second side support 52 is fixedly attached to second side sleeve 50 using a screw or bolt. In another embodiment, second side support 52 can be fixedly attached to second side sleeve 50 using any other suitable means, such as (but not limited to) a clamp, a clip, or a strap. Second side support 52 is configured to telescope between a shortened position and an extended position. With second side support 52 in the shortened position second side wall 22 is able to fold in against inner surface 18A of front wall 18, between rods 30C and 30D. This allows foldable blind 10 to fold into the collapsed configuration in which rods 30A-30D and second side support 52 are parallel to each other. When second side support 52 is in the extended position, foldable blind 10 can stand in its upright setup configuration. Second side support 52 provides stability and support to foldable blind 10.

In the embodiment shown, second side support 52 is fixedly attached to second side sleeve 50 of second side wall 22 and configured to telescope between a shortened position and an extended position. In another embodiment, second side support 52 can be an extendable or fixed-length rod that is removable from second side sleeve 50 of second side wall 22. Removing the rod allows second side wall 22 to fold in against inner surface 18A of front wall 18 and also allows foldable blind 10 to fold into its collapsed configuration. When second side support 52 is fixedly attached to second side wall 22, second side support 52 must be an extendable/retractable rod to allow foldable blind 10 to collapse into the configuration in which all rods and poles are parallel to each other. When second side support 52 is removable from second side wall 22, second side support 52 can be extendable or fixed-length. With the extendable or fixed-length rod removed, foldable blind 10 is able to fold into the collapsed configuration in which all rods and poles are parallel to each other. A fully collapsed foldable blind 10 is essential for easy and efficient transport of foldable blind 10.

Second base sleeve 54 is positioned along and extends the entire length of bottom edge 22C of second side wall 22. Second base support 56 is a fixed-length rod positioned within and fixedly attached to second base sleeve 54 at one end of the rod and securely held in place by second base sleeve 54 at the other end of the rod. In the embodiment shown, second base support 56 is fixedly attached to second base sleeve 54 using a screw or bolt. In another embodiment, second base support 56 can be fixedly attached to second base sleeve 54 using any other suitable means, such as (but not limited to) a clamp, a clip, or a strap. Second base support 56 provides extra support and stability to foldable blind 10 when in the setup configuration. In the embodiment shown, second base support 56 is included in foldable blind 10. In another embodiment, second base support 56 does not need to be included in foldable blind 10.

Second clamp 58 is positioned within a notch in second side sleeve 50 and located on second side support 52. Second clamp 58 securely holds second side support 52 in both the shortened position and the extended position. In the embodiment shown, second clamp 58 is a thumb screw that is turned by hand to tighten or loosen second clamp 58. In another embodiment, second clamp 58 could be a set screw, a collet, or other locking or clamping device that could secure second side support 52 in both the shortened position and the extended position.

Stubble straps 38 are located on each of front wall 18, first side wall 20, and second side wall 22. Stubble straps 38 are connected to each wall every few inches to create a plurality of small pockets running across outer surface 18B of front wall 18, outer surface 20B of first side wall 20, and outer surface 22B of second side wall 22. Further, stubble straps 38 are parallel to each of bottom edge 18C of front wall 18, bottom edge 20C of first side wall 20, and bottom edge 22C of second side wall 22. Stubble straps 38 are used to hold natural vegetation to foldable blind 10 to camouflage better with the surrounding environment. Stubble straps are known and will not be discussed further.

Aperture 18D of front wall 18, aperture 20D of first side wall 20, and aperture 22D of second side wall 22 are used as gun rests. The user inserts the barrel of a gun through one of apertures 18D, 20D, or 22D and places the butt of the gun on the ground. Apertures 18D, 20D, and 22D allow a user to store the gun in a safe location and point the muzzle in a safe direction while the gun is not being used. Other ground blinds do not include an aperture specifically for the purpose of safely storing a gun, resulting in the gun being placed on the ground or lap of the user and potentially pointing the muzzle of the gun in a dangerous direction. Apertures 18D, 20D, and 22D allow the user to safely store the gun when not in use and also allows the user to quickly access the gun when it is desired to use the gun. Apertures 18D, 20D, and 22D help a user to safely and effectively hunt birds from foldable blind 10.

Figure 3:
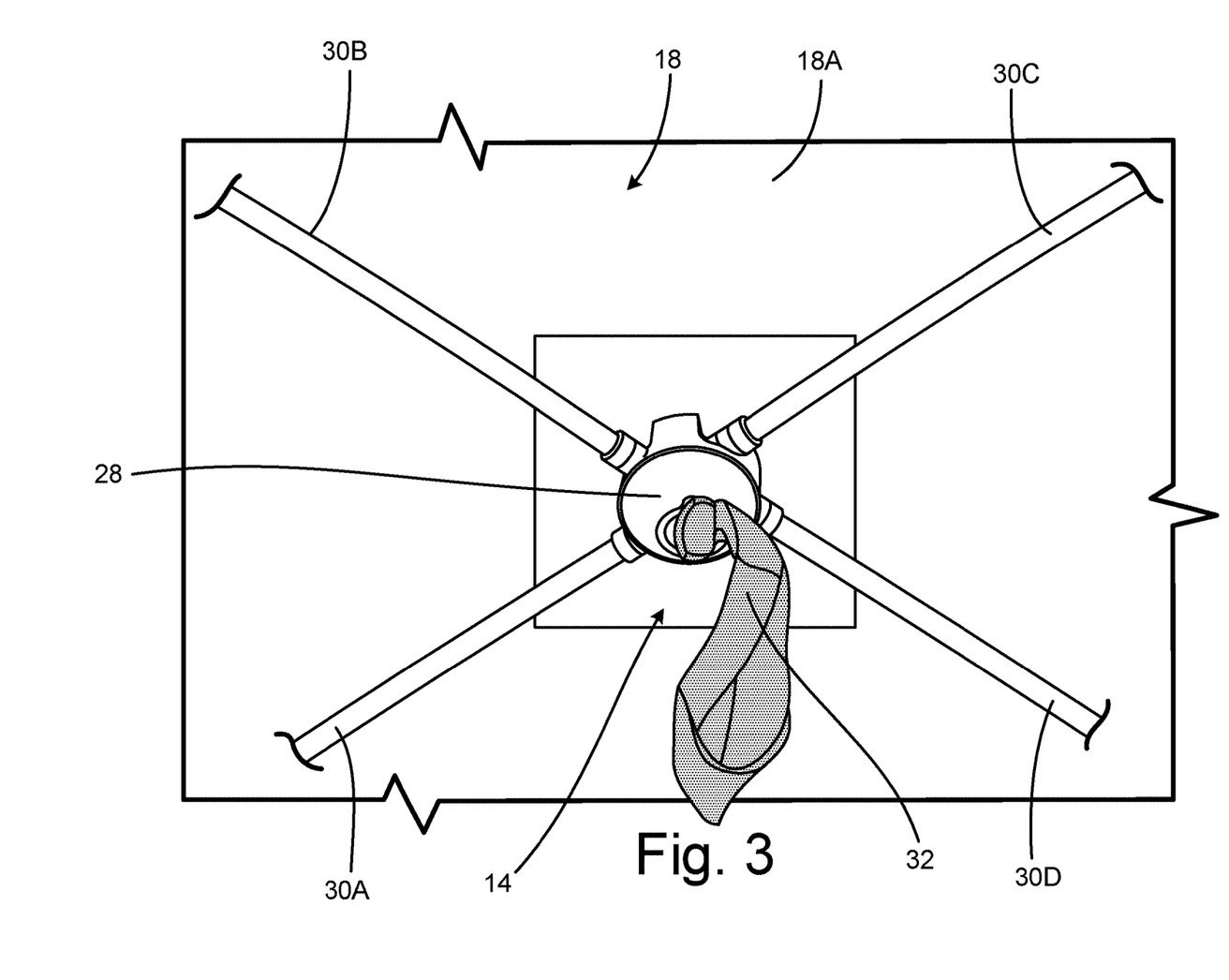
FIG. 3 is a close-up view of a hub assembly.

Shown in FIGS. 2A, 2B, and 3, hub assembly 14 includes hub 28, rods 30A-30D, and loop 32. Hub 28 is the center piece of hub assembly 14 and is coupled to rods 30A-30D and loop 32. Hub 28 is also fixedly attached to the center of inner surface 18A of front wall 18 and therefore attaches hub assembly 14 to fabric body 12 of foldable blind 10. One end of each rod 30A-30D is rotatably attached to hub 28 and encompassed at the other end by one of rod pockets 36A-36D. Rod pockets 36A-36D securely hold rods 30A-30D when in both the setup and collapsed configurations of foldable blind 10. When transitioning from the collapsed configuration to the setup configuration, pressure is applied to hub 28 from the inside of foldable blind 10 causing rods 30A-30D to rotate outward approximately ninety degrees with respect to hub 28. Further, the rotation causes rods 30A-30D to flex under pressure into a concave configuration when viewing from the inside of foldable blind 10. With hub 28 and rod pockets 36A-36D securely holding rods 30A-30D, rods 30A-30D will remain in the concave tensioned position and keep foldable blind 10 in the setup configuration. Rods 30A-30D will remain in the concave position until a force overcomes the tension in rods 30A-30D, causing foldable blind 10 to fold into the collapsed configuration. In the embodiment shown, there are four rods 30A-30D but in other embodiments there can be as many rods as desired. Rods 30A-30D provide support and structure to foldable blind 10 while also being flexible enough to bend under pressure. Loop 32 is attached to the center of hub 28 and is configured to aid in the disassembly of foldable blind 10 from the setup configuration to the collapsed configuration. Loop 32 is pulled toward the inside of foldable blind 10 and away from outer surface 18B of front wall 18, causing rods 30A-30D to rotate and release tension in rods 30A-30D. This allows foldable blind 10 to be further disassembled into its collapsed configuration.

Transitioning foldable blind 10 from the collapsed configuration to the setup configuration involves the following steps. (1) Stand foldable blind 10 on the corners of outside surface 18B of front wall 18. (2) Spread rods 30A-30D out wide so foldable blind 10 is still standing on the corners of outside surface 18B, but in an expanded configuration. (3) Apply pressure to hub 28 from the inside of foldable blind 10, causing rods 30A-30D to rotate into a tensioned concave position wherein hub 28 and rod pockets 36A-36D securely hold rods 30A-30D in the tensioned concave position. (4) Rotate first side wall 20 and second side wall 22 outward away from inner surface 18A of front wall 18. (5) Stand foldable blind on bottom edge 18C of front wall 18, bottom edge 20C of first side wall 20, and bottom edge 22C of second side wall 22 so foldable blind 10 is standing in the upright position. (6) Loosen first clamp 48 of first side wall 20 and second clamp 58 of second side wall 22. (7) Extend first side support 42 and second side support 52 from the shortened position to the extended position. (8) Tighten first clamp 48 of first side wall 20 and second clamp 58 of second side wall 22. (9) Foldable blind 10 is now in the setup configuration, ready to be used by a hunter or other outdoorsman.

Foldable blind 10 provides many advantages for bird hunters over previous foldable blinds. Foldable blind 10 includes a single hub assembly 14 to provide structure and support to foldable blind 10. Using a single hub assembly 14 reduces the weight of foldable blind 10, making foldable blind 10 easier to transport than previous foldable blinds that use multiple hub assemblies. Further, using a single hub assembly 14 makes it faster to setup foldable blind 10 compared to previous foldable blinds that use multiple hub assemblies. Foldable blind 10 also includes apertures 18D, 20D, and 22D which are used as gun rests. Apertures 18D, 20D, and 22D allow a user to store the gun in a safe location and point the muzzle in a safe direction while the gun is not being used. Previous ground blinds do not include an aperture specifically for this purpose, resulting in the gun being placed on the ground or lap of the user and potentially pointing the muzzle of the gun in a dangerous direction. Apertures 18D, 20D, and 22D allow the user to safely store the gun when not in use and also allows the user to quickly access the gun when it is desired to use the gun. Foldable blind 10 also includes door 34 which is configured to be a dog door. Door 34 allows a dog to quickly and easily enter or exit foldable blind 10 when retrieving birds. Further, door 34 allows foldable blind 10 to be placed close to or within natural vegetation, in which entering or exiting foldable blind 10 from the open side is difficult, to better conceal the user while still allowing a dog to easily enter and exit foldable blind 10.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A foldable blind comprising:
    a fabric front wall having four corners;
    a fabric first side wall coupled to the front wall, wherein the fabric first side wall includes an aperture positioned in a top half of the fabric first side wall and wherein a bottom of the first side wall is broader than a top of the first side wall;
    a fabric second side wall coupled to the front wall, wherein the fabric second side wall includes an aperture positioned in a top half of the fabric second side wall and wherein a bottom of the second side wall is broader than a top of the second side wall;
    an aperture in an upper portion of the front wall;
    a hub assembly comprising:
        a hub attached to an inner surface of the front wall at a center location of the front wall in both vertical and horizontal directions;
        a first rod extending from the hub to a first upper corner of the front wall;
        a second rod extending from the hub to second upper corner of the front wall;
        a third rod extending from the hub to a first lower corner of the front wall; and
        a fourth rod extending from the hub to a second lower corner of the front wall;
    four rod pockets, wherein each of the four rod pockets is positioned on the inner surface of the fabric front wall and adjacent one of the four corners of the fabric front wall, each of the four rod pockets being configured to receive an end of one of the four rods;
    a first base support coupled to the first sidewall and extending rearward from the first lower corner of the front wall wherein the first base support is positioned along the bottom of the first side wall;

a second base support coupled to the second side wall and extending rearward from the second lower corner of the front wall wherein the second base support is positioned along the bottom of the second side wall;

a first side support coupled to the first side wall and extending between the first upper corner of the front wall and a rear end of the first base support; and a second side support coupled to the second side wall and extending between the second upper corner of the front wall and a rear end of the second base support.

2. The foldable blind of claim 1, wherein the first side support is removable from the first side wall and the second side support is removable from the second side wall.

3. The foldable blind of claim 1, wherein the first side support and the second side support are configured to transition from a shortened position to an extended position.

4. The foldable blind of claim 1, wherein the foldable shelter is manually collapsible into a configuration wherein the first, second, third, and fourth rods, the first side support, the second side support, the first base support, and the second base support are substantially parallel to each other.

5. The foldable blind of claim 1, wherein the first side wall is tapered in shape from bottom to top, and wherein the second side wall is tapered in shape from bottom to top.

6. The foldable blind of claim 1, wherein the hub assembly further includes a loop attached to an inner surface of the hub, and wherein the loop is configured to pull the hub away from the front wall during disassembly of the foldable shelter.

7. The foldable blind of claim 1, and further comprising:
a plurality of stubble straps that extend across the fabric front wall, the fabric first side wall, and the second fabric side wall.

8. A foldable blind comprising:
a fabric front wall including an aperture positioned in a top half of the front wall and a plurality of rod pockets positioned on an inner surface of the front wall, wherein each of the rod pockets is adjacent one corner of the front wall;

a single hub assembly including a hub attached to the inner surface of the fabric front wall and a plurality of rods, each rod extending from the hub to one corner of the fabric front wall, wherein each of the plurality of rod pockets of the fabric front wall is configured to receive an end of one of the plurality of rods of the hub assembly, wherein the hub of the hub assembly is attached to the inner surface of the fabric front wall at a center location of the fabric front wall, in both vertical and horizontal directions;

a fabric first side wall coupled to the front wall, wherein the first side wall includes an aperture positioned in a top half of the first side wall, wherein a bottom of the first side wall is broader than a top of the first side wall;

a fabric second side wall coupled to the front wall, wherein the second side wall includes an aperture positioned in a top half of the second side wall, wherein a bottom of the second side wall is broader than a top of the second side wall; and a first side support extending along and supporting the fabric first side wall;

a first base support positioned along and engaging the bottom edge of the fabric first side wall;

a second side support extending along and supporting the fabric second side wall;

a second base support positioned along and engaging the bottom edge of the fabric second side wall, fabric second side wall;

wherein the fabric front wall, fabric first side wall, and fabric second side wall constitute a fabric body, and wherein the fabric body is a continuous, single piece of fabric.

9. The foldable blind of claim 8, wherein each of the rods is rotatable within the hub assembly from a collapsed position in which the rods are parallel to each other in an axial direction to an extended position in which the rods form an x shape with the hub at a center of the x shape.

10. The foldable blind of claim 8, wherein a plurality of stubble straps disposed on an outer surface of each of the fabric front wall, fabric first side wall, and fabric second side wall.

11. A foldable blind comprising:
a fabric front wall having a rectangular shape with four corners including an aperture positioned in a top half of the fabric front wall;

a fabric first side wall coupled to the fabric front wall, wherein the fabric first side wall includes a first side support and an aperture positioned in a top half of the fabric first side wall and wherein a bottom of the first side wall is broader than a top of the first side wall;

a fabric second side wall coupled to the fabric front wall, wherein the fabric second side wall includes a second side support and an aperture positioned in a top half of the fabric second side wall and wherein a bottom of the second side wall is broader than a top of the second side wall;

a single hub assembly comprising a hub attached to an inner surface of the fabric front wall at a center location of the front wall in both vertical and horizontal directions, and four rods, wherein each of the four rods extends from the hub to one of the four corners of the rectangular shaped fabric front wall, wherein each of the rods is rotatable within the hub assembly from a collapsed position in which the rods are parallel to each other in an axial direction to an extended position in which the rods are non-parallel to each other in an axial direction; and four rod pockets, wherein each of the four rod pockets is positioned on the inner surface of the fabric front wall and adjacent one of the four corners of the fabric front wall, each of the four rod pockets being configured to receive an end of one of the four rods;

wherein the fabric first side wall further includes a first base support, and the fabric second side wall includes a second base support, and wherein the first base support extends along the bottom edge of the fabric first side wall and the first base support is attached to and positioned within a first base sleeve, and wherein the second base support extends along the a bottom edge of the fabric second side wall and the second base support is attached to and positioned within a second base sleeve;

wherein the fabric front wall, the fabric side wall, and the fabric second side wall each include a plurality of stubble straps disposed on an outer surface of the fabric front wall, the fabric first side wall, and the fabric second side wall, respectively.

12. A foldable blind comprising:
a front wall that includes four rod pockets positioned on an inner surface of the front wall, wherein each of the rod pockets is adjacent one corner of the front wall;

a first side wall coupled to the front wall, wherein the first side wall includes a first side support and a first base support wherein a bottom of the first side wall is broader than a top of the first side wall;

a second side wall coupled to the front wall, wherein the second side wall includes a second side support and a second base support a bottom of the second side wall is broader than a top of the second side wall; and a single hub assembly comprising a hub attached to the inner surface of the front wall at a center location of the front wall in both vertical and horizontal directions, and a first upper rod, a first lower rod, a second upper rod, and a second lower rod;

wherein each rod extends from the hub to corner of the front wall;

wherein each of the rod pockets is configured to receive an end of one of the rods of the hub assembly;

wherein the first base support extends along and engages a bottom edge of the first side wall;

wherein the second base support extends along and engages a bottom edge of the second side wall;

wherein the first side support is connected between the first upper rod and the first base support and engages and supports a side edge of the fabric first side wall; and wherein the second side support is connected between the second upper rod and the second base support and engages and supports a side edge of the fabric second side wall.

13. The foldable blind of claim 12, wherein the first side support is a fixed-length rod that is removable from the first side wall, and wherein the second side support is a fixed-length rod that is removable from the second side wall.

14. The foldable blind of claim 12, wherein the first side wall includes an aperture positioned in a top half of the first side wall, and the second side wall includes an aperture positioned in a top half of the second side wall.

15. The foldable blind of claim 12, and further comprising:

a plurality of stubble straps disposed on an outer surface of the front wall and positioned parallel to a bottom edge of the front wall;

a plurality of stubble straps disposed on an outer surface of the first side wall and positioned parallel to a bottom edge of the first side wall; and a plurality of stubble straps disposed on an outer surface of the second side wall and positioned parallel to a bottom edge of the second side wall; and wherein the plurality of stubble straps extend across each respective wall parallel to the bottom edge of each respective wall.

* * * * *